(12) United States Patent
Strater et al.

(10) Patent No.: US 11,696,171 B2
(45) Date of Patent: Jul. 4, 2023

(54) MITIGATION OF EXCESSIVE CLIENT STEERING ATTEMPTS IN MULTIPLE ACCESS POINT NETWORKS

(71) Applicant: ARRIS Enterprises LLC, Suwanee, GA (US)

(72) Inventors: Jay William Strater, San Diego, CA (US); Chethan Alur Gurumallappa, Bengaluru (IN); Diwya Kandagath Mohanan, Bangalore (IN); Paul D. Baker, San Diego, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/241,632

(22) Filed: Apr. 27, 2021

(65) Prior Publication Data
US 2022/0070723 A1 Mar. 3, 2022

Related U.S. Application Data

(60) Provisional application No. 63/072,474, filed on Aug. 31, 2020.

(51) Int. Cl.
*H04W 28/02* (2009.01)
*H04W 28/086* (2023.01)

(52) U.S. Cl.
CPC ... *H04W 28/0289* (2013.01); *H04W 28/0808* (2020.05)

(58) Field of Classification Search
CPC ......... H04W 28/0289; H04W 28/0808; H04W 84/12; H04W 36/0079
See application file for complete search history.

(56) References Cited

U.S. PATENT DOCUMENTS 9,872,210 B2 * 1/2018 Henderson ............ H04W 36/22
2015/0282067 A1 * 10/2015 Zhu .................. H04W 52/0206
370/311

(Continued)

FOREIGN PATENT DOCUMENTS

EP 3579618 A1 * 12/2019
JP 6501314 4/2019

OTHER PUBLICATIONS

International Search Report dated Aug. 2, 2021 in International (PCT) Application No. PCT/US2021/029357.

(Continued)

*Primary Examiner* — Mehmood B. Khan
(74) *Attorney, Agent, or Firm* — Wenderoth, Lind & Ponack, L.L.P.

(57) ABSTRACT

A network controller is provided for use with a client device. The network controller includes a memory and a processor configured to execute instructions stored on the memory. The instructions when executed by the processor cause the network controller to set a value of a steering delay based on a steering trigger type, transmit a steering request to steer the client device from a first BSS ID to a second BSS ID, determine whether the client device has steered from the first BSS ID to the second BSS ID during the steering delay measured from the transmission of the steering request, and in response to a determination that the client device has not steered from the first BSS ID to the second BSS ID during the steering delay, increase the value of the steering delay by an increase amount and again transmit the steering request.

18 Claims, 7 Drawing Sheets

(56) References Cited

U.S. PATENT DOCUMENTS

| | | | |
|---|---|---|---|
| 2017/0303179 A1 | 10/2017 | Mitsui et al. | |
| 2018/0176284 A1* | 6/2018 | Strater | H04W 36/08 |
| 2018/0206184 A1 | 7/2018 | Bahr et al. | |
| 2018/0352493 A1* | 12/2018 | Strater | H04W 36/08 |
| 2018/0352497 A1 | 12/2018 | Taskin et al. | |
| 2018/0376530 A1 | 12/2018 | Fujishiro et al. | |
| 2019/0028482 A1* | 1/2019 | Pallas | H04W 48/16 |
| 2019/0306068 A1* | 10/2019 | Kiss | H04W 36/08 |
| 2020/0205049 A1* | 6/2020 | Strater | H04W 36/18 |

OTHER PUBLICATIONS

International Preliminary Report on Patentability and Written Opinion of the International Searching Authority dated Feb. 28, 2023 in International (PCT) Application No. PCT/US2021/029357.

\* cited by examiner

| 510 | 512 | 514 |
|---|---|---|
| Trigger Type | Minimum Delay | Delay Back-Off |
| RSSI Level | 5 | $d(t_2)=d(t_1)+2$ |
| Congestion | 3 | $d(t_2)=d(t_1)+5$ |
| Backhaul Link Utilization | 6 | $d(t_2)=e^\wedge d(t_1)$ |
| Proactive Load Balancing | 7 | $d(t_2)=2^\wedge d(t_1)$ |

| 608 | 610 | 612 | 614 | 616 | 618 | 620 |
|---|---|---|---|---|---|---|
| Client | APD | Steering Candidate | Request Sent | Request Denied | Request Number | Request Delay |
| 104 | 304 | No | No | NA | NA | |
| 106 | 306 | Yes | Yes | Yes | 3 | d(3) |
| 108 | 308 | Yes | Yes | Yes | 2 | d(2) |

MITIGATION OF EXCESSIVE CLIENT STEERING ATTEMPTS IN MULTIPLE ACCESS POINT NETWORKS

BACKGROUND

Embodiments of the present disclosure relate to client device steering in a multiple access point device network.

SUMMARY

Aspects of the present disclosure are drawn to a network controller for use with a client device. The network controller includes a memory, and a processor configured to execute instructions stored on the memory to cause the network controller to: (a) set a value of a steering delay based on a steering trigger type; (b) transmit a steering request to steer the client device from a first BSS ID to a second BSS ID; (c) determine whether the client device has steered from the first BSS ID to the second BSS ID during the steering delay measured from the transmission of the steering request; and (d) in response to a determination that the client device has not steered from the first BSS ID to the second BSS ID during the steering delay, increase the value of the steering delay by an increase amount and again transmit the steering request.

In some embodiments, the processor is further configured to execute instructions stored on the memory to cause the network controller to repeat execution of (b) through (d) until the processor has determined that the client device has steered from the first BSS ID to the second BSS ID.

In some embodiments, the increase amount is an exponential function such that as the processor repeats execution of (b) through (d), wherein the value of the steering delay increases exponentially.

In some embodiments, the processor is further configured to execute instructions stored on the memory to cause the network controller to: set a maximum value based on the steering trigger type, repeat execution of (b) through (d), and determine whether the value of the steering delay is the maximum value. Additionally, the processor may be configured to execute instructions stored on the memory to cause the network controller to set the increase amount to zero so as to limit the value of the steering delay so as not to exceed the maximum value, in response to a determination that the value of the steering delay is the maximum value.

In some embodiments, the value of the steering delay set in (a) is based on the steering trigger type selected from a group of steering trigger types consisting of a received signal strength indicator (e.g., RSSI or PHY rate) type trigger, a traffic congestion type trigger, backhaul link utilization (e.g., between APDs) and proactive load balancing (e.g., pushing clients from 2.4 GHz radio to 5 GHz radio).

In some embodiments, the processor is further configured to execute instructions stored on the memory to cause the network controller to transmit the steering request as a basic service system transition management steering request.

Other aspects of the present disclosure are drawn to a method of using network controller with a client device. The method includes: (a) setting, via a processor configured to execute instructions stored on a memory, a value of a steering delay based on a steering trigger type; (b) transmitting, via the processor, a steering request to steer the client device from a first BSS ID to a second BSS ID; (c) determining, via the processor, whether the client device has steered from the first BSS ID to the second BSS ID during the steering delay measured from the transmission of the steering request; and (d) in response to a determination that the client device has not steered from the first BSS ID to the second BSS ID during the steering delay, increasing, via the processor, the value of the steering delay by an increase amount and again transmit the steering request.

In some embodiments, the method further includes repeating, via the processor, execution of (b) through (d) until the processor has determined that the client device has steered from the first BSS ID to the second BSS ID.

In some embodiments, the increase amount is an exponential function such that as the processor repeats execution of (b) through (d), the value of the steering delay increases exponentially.

In some embodiments, the method further includes setting, via the processor, a maximum value based on the steering trigger type; repeating, via the processor, execution of (b) through (d); determining, via the processor, whether the value of the steering delay is the maximum value; and in response to a determination that the value of the steering delay is the maximum value, setting, via the processor, the increase amount to zero so as to limit the value of the steering delay so as not to exceed the maximum value.

In some embodiments, the value of the steering delay set in (a) is based on the steering trigger type selected from a group of steering trigger types consisting of a received signal strength indicator (e.g., RSSI or PHY rate) type trigger, a traffic congestion type trigger, backhaul link utilization (e.g., between APDs) and proactive load balancing (e.g., pushing clients from 2.4 GHz radio to 5 GHz radio).

In some embodiments, the transmitting the steering request includes transmitting, via the processor, the steering request as a basic service system transition management steering request.

Other aspects of the present disclosure are drawn to computer-readable media having computer-readable instructions stored thereon, wherein the computer-readable instructions are capable of being read by a network controller for use with a client device. The computer-readable instructions are capable of instructing the network controller to perform a method including: (a) setting, via a processor configured to execute instructions stored on a memory, a value of a steering delay based on a steering trigger type; (b) transmitting, via the processor, a steering request to steer the client device from a first BSS ID to a second BSS ID; (c) determining, via the processor, whether the client device has steered from the first BSS ID to the second BSS ID during the steering delay measured from the transmission of the steering request; and (d) in response to a determination that the client device has not steered from the first BSS ID to the second BSS ID during the steering delay, increasing, via the processor, the value of the steering delay by an increase amount and again transmit the steering request.

In some embodiments, the computer-readable instructions are capable of instructing the network controller to perform the method further including repeating, via the processor, execution of (b) through (d) until the processor has determined that the client device has steered from the first BSS ID to the second BSS ID.

In some embodiments, the computer-readable instructions are capable of instructing the network controller to perform the method wherein the increase amount is an exponential function such that as the processor repeats execution of (b) through (d), the value of the steering delay increases exponentially.

In some embodiments, the computer-readable instructions are capable of instructing the network controller to perform the method further including: setting, via the processor, a maximum value based on the steering trigger type; repeating, via the processor, execution of (b) through (d); determining, via the processor, whether the value of the steering delay is the maximum value; and in response to a determination that the value of the steering delay is the maximum value, setting, via the processor, the increase amount to zero so as to limit the value of the steering delay so as not to exceed the maximum value.

In some embodiments, the computer-readable instructions are capable of instructing the network controller to perform the method wherein the value of the steering delay set in (a) is based on the steering trigger type selected from a group of steering trigger types consisting of a received signal strength indicator (e.g., RSSI or PHY rate) type trigger, a traffic congestion type trigger, backhaul link utilization (e.g., between APDs) and proactive load balancing (e.g., pushing clients from 2.4 GHz radio to 5 GHz radio).

In some embodiments, the computer-readable instructions are capable of instructing the network controller to perform the method wherein the transmitting the steering request includes transmitting, via the processor, the steering request as a basic service system transition management steering request.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 5 illustrates an example data structure for storing information pertaining to one or more trigger types, in accordance with aspects of the present disclosure; and FIG. 6 illustrates a non-limiting example of a data structure for storing steering information for one or more client devices, in accordance with aspects of the present disclosure.

DETAILED DESCRIPTION

A conventional wireless local area network (WLAN), e.g., Wi-Fi home network, may include multiple devices to address connectivity issues within the home. Extenders may be added to a home network to increase the wireless, e.g., Wi-Fi, coverage area. This kind of environment includes a home network controller (HNC) component, or HNC, running on a device (gateway or extender, also known as an APD) within home network to steer clients, such as mobile devices, from one access point to another to provide better connectivity for the client. A device in which the HNC resides is considered an HNC device. Steering a client from one APD to another may be required to efficiently utilize the home network bandwidth.

Within a Wi-Fi network with multiple APD, there are times where the HNC device will determine that a client device should be steered.

Several conditions can prompt an HNC to determine whether a client device should be steered. These include poor link quality (low RSSI or PHY rate) with its associated basic service set (BSS), high front-haul (FH) channel utilization on its associated BSS, high link utilization from its device's BH-STA (bSTA) backhaul connection to its upstream device's BH-BSS. In addition, the HNC may try to proactively try to steer a client device for radio band purposes, such as for example, trying to steer a client device from its associated BSS with 2.4 GHz radio to a BSS with 5 GHz radio if the HNC determines that the client device is better served on a 5 GHz radio, assuming such a BSS exists and does not have link quality or utilization issues.

An HNC will typically have a set of configuration parameters and associated settings for its steering control logic. These can include trigger thresholds for a client device steering condition, screening parameters for client device selection when multiple client devices have the same trigger condition, and screening parameters for candidate BSS (radio AP) to steer a client device. client device selecting screening, in particular, will typically include a configuration setting for the minimum allowed delay between steering attempts, to prevent excessively rapid steering attempts for a given client device. Likewise, configuration delays can be included to control the frequency of proactive band-steering attempts, both per client device and in aggregate. Finally, additional protection can be included to put a client device in a temporary no-steer condition if a configurable number of client device steer attempts within a given period fail. A conventional WLAN will now be described with reference to FIGS. 1A-B.

Figure 1A:
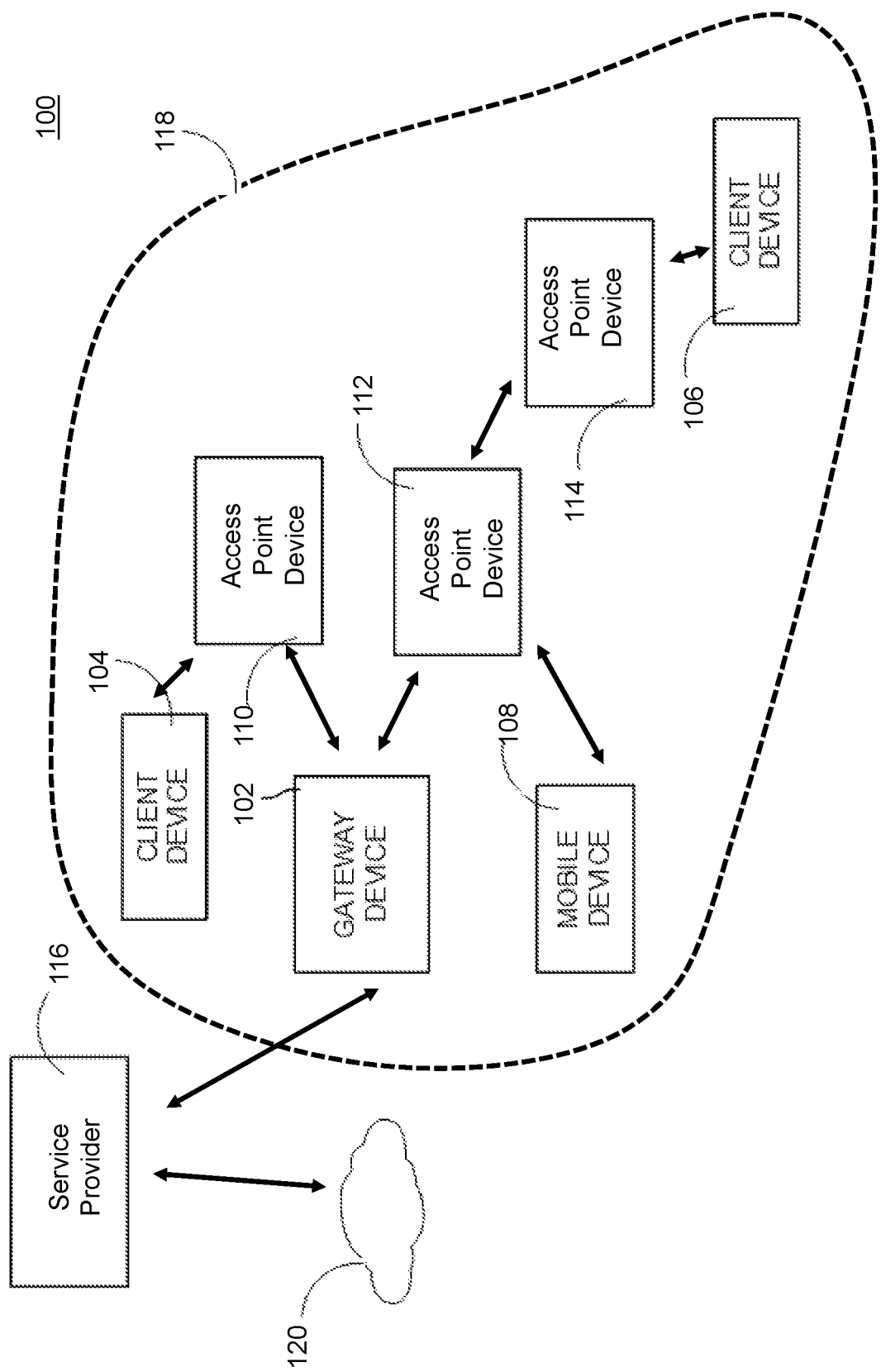
FIG. 1A illustrates structural components implementing a conventional electronic communication network at a time $T_0$, in accordance with aspects of the present disclosure.

FIG. 1A illustrates structural components implementing a conventional electronic communication network 100 (hereinafter 'network 100') at a time $T_0$.

As shown in the figure, network 100 includes: a gateway device 102; a plurality of client devices, a sample of which are illustrated as a client device 104; and a client device 106; a mobile device 108; a plurality of APDs, a sample of which are illustrated as an APD 110, an APD 112, and an APD 114; a service provider 116; a WLAN 118; and a wireless network 120.

A gateway device 102, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 102 may be any device or system that is operable to allow data to flow from one discrete network to another, which in this example is from WLAN 118 in figure to external network 120, e.g., the Internet. Gateway device 102 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 102 establishes, or is part of, WLAN 118, using Wi-Fi for example, such that client devices 104, 106, and mobile device 108, and APDs 110, 112, and 114 are able to communicate wirelessly with gateway device 102. In particular, gateway device 102 is able to communicate wirelessly directly with APDs 110 and 112. Further, gateway device 102 is able to communicate wirelessly with client device 104 via APD 110 and is able to communicate wirelessly with client device 106 via APD 112 and APD 114. The term Wi-Fi as used herein may be considered to refer to any of Wi-Fi 4, 5, 6, 6E, or any variation thereof.

Further, it should be noted that gateway device 102 is able to communicate wirelessly directly with service provider 116, and further is able to connect to external network 120, e.g., the Internet, via service provider 116. Still further, gateway device 102 acts as an HNC to control steering of client devices within the WLAN.

Service provider 116 includes head-end equipment such as server computers (e.g., automatic configuration server ACS, cable modem termination system CMTS) that enable a content provider, such as a cable television provider, a satellite television provider, an internet service provider, or multiple-systems operator (MSO), to provide content (such as audio/video content and/or internet service) either through a coaxial network, an optical fiber network, and/or DSL, or wireless network 120, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g, FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Gateway device 102 serves as a gateway or access point to external network 120, e.g., the Internet (or otherwise as mentioned above), for one or more electronic devices, referred to generally herein as client devices 104, 106, and mobile device 108 that wirelessly communicate with gateway device 102 via, e.g., Wi-Fi. Client devices 104, 106, and mobile device 108 can be desk top computers, laptop computers, electronic tablet devices, smart phones, appliances, or any other so-called internet of things equipped devices that are equipped to communicate information via WLAN 118.

APDs 110, 112, and 114 can be paired with gateway device 102 in order to communicate wirelessly with gateway device 102 and extend the coverage area of WLAN 118. Any of the client devices 104, 106, and mobile device 108 can be in communication with gateway device 102 or any of APDs 110, 112, and 114. Mobile device 108 can also have a wireless data communication via wireless network 120 e.g., 3G, LTE, 4G, 5G, etc., with a mobile data provider 118.

Gateway device 102 has the capability of wirelessly communicating with plural electronic user devices over respective communication avenues. In order to extend the area in which WLAN 118 is effective, beyond the radio reach of gateway device 102, one of APDs 110, 112, and 114 can be added. The establishment of the operative communications between the APD 112 and gateway device 102 (or between APD 114 and an already established APD 112) is referred to as onboarding the extender. The APDs 112 and 114 can communicate wirelessly with gateway device 102. However, rather than using one of the communication avenues that are allocated for communication with user devices, a dedicated avenue of communication may be established, at least at sometimes, between the extender and gateway device 102. This dedicated avenue is referred to as a backhaul.

Within WLAN 118, electronic devices are often referred to as being stations in WLAN 118. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 118, gateway device 102, access points 110, 112, and 114 are access points for WLAN 118.

In conventional network arrangements, such as network 100, client devices 102, 104, and mobile device 108 may communicate with the gateway device 102 wirelessly through one or more of the APDs 110, 112, and 114. In an example shown in the figure, client device 104 is associated to APD 110; client device 106 is associated to APD 114; and mobile device 108 is associated to APD 112, at the given time $T_0$. For the associations, client devices 104, 106, and mobile device 108 may initially request to discover 802.11 networks, such as network 100, within its proximity. One or more probe requests that advertise supported data rates and network capabilities are sent from the client devices to the destination layer-2 address and BSS ID of all the APDs 110, 112, and 114. APDs 110, 112, and 114, after receiving the one or more probe requests may check to see if the respective client device has at least one adequate link quality to the APD If an adequately high RSSI or data rate is found, this information is shared with the HNC which then determines if the client device can and should be steered to another APD assuming there was a condition requiring the client device to be steered. A respective association of the client device with the APD is then established.

In some scenarios, one or more of the client devices may be required to steer from one access point to another access point. The steering of the client device may be based on one or more trigger types. These trigger types may include Received Signal Strength Indicator (RSSI) levels, traffic congestion, backhaul link utilizations and/or proactive load balancing. For example, as referred in the figure, gateway device 102 may request to steer client device 106, from its associated APD 114 to APD 112.

The steering request, in an example, may be sent from gateway device 102 to client device 106 based on a determination that a RSSI level between client device 106 and associated APD 114 has dropped below a certain value, indicating a poor link quality. In another example, the steering request may be sent to client device 106, when it is determined that a link utilization of a backhaul connection between client device 106 and APD 114 is higher than optimal. Similarly, the steering request may also be sent to client device 106 proactively when one or more APDs with higher radio frequencies are available. For example, if client device 106 is associated with APD 114 through a 2.4 GHz band, and another APD in the network 100 is operating on a 5 GHz band, client device 106 may be provided an option to switch to one of the other APDs operating on the 5 Hz band.

Typically, gateway device 102 may utilize a set of configuration parameters and associated settings to generate a steering logic for each trigger type. These configuration parameters may include threshold values for each trigger type, and screening parameters for APDs 110, 112, and 114. Further, the configuration parameters may also include a setting for a minimum delay between consecutive steering attempts for a single client device. This minimum delay may be included to prevent excessive and rapid steering attempts on a given client device. Further, the minimum delays may also provide for a control on the frequency of proactive steering attempts, both per client device and in total. Finally, additional protective measures may be included in the steering logic to put a given client device in a temporary no-steer condition, when the number of steering attempts within a given period fail.

However, even with the minimum delays and the protective measures, the steering logic may cause excessive steering attempts for client device 106. The excessive steering attempts may be resultant due to one or more conditions associated with the client device 106. For example, client device 106 may not be steered due because the Wi-Fi logic of client device 106 may reject the steering attempt. This may occur due to rejection of a BSS transition management (BTM) or blacklist steering request by client device 106, owing to the fact that Wi-Fi logic of client device 106 may not allow for exiting a current comfortable RSSI association with the APD 114. This may also be particularly problematic for channel utilization or proactive band steering attempts for client device 106.

The steering attempt may also fail due to client device 106 Wi-Fi logic not supporting the type of steering request being received. For example, the BTM steering request sent by gateway device 102 to client device 106, may be unsupported by client device 106. In another example, in case of proactive steering requests, client device 106 may reject the request if it only supports a particular radio frequency capability and the APD that client device 106 is requested to be steered to, operates on a different radio frequency band. Other Wi-Fi logic and/or network limitations may prevent the steering requests to be completed by client device 106.

Generally, gateway device 102 may send the steering request continuously to client device 106, till it is determined that the client device has steered to a different APD. The continuous steering attempts, however, may be detrimental to the workings of network 100. For instance, excessive steering attempts may cause clogging of log files and loss of important historical log data, thus creating general operator concern over the condition of network 100. In some cases, client device 106 may be blocked from steering to a different access point if the trigger type for steering has a lower priority than another trigger type for which a steering attempt was previously unsuccessful. Similarly, the client device 106 may also be blocked from steering if client device 106 is ranked lower than other client devices in a selection list of client devices that were previously successfully steered.

In some scenarios, the Wi-Fi logic of client device 106 may detach client device 106 from network 100 and move into a cellular network after unsuccessful steering. This can be partially mitigated by temporary no-steer condition as discussed earlier. However, there is a downside to over-relying on no-steer conditions as they typically require significant wait periods before allowing the client device 106 to be steered again.

In cases where the steering attempt of client device 106 is successful, client device 106 is detached from its current APD 114 and associated with a new APD in network 100. The workings of network 100, after client device 106 is successfully steered is described in further detail with regards to FIG. 1B.

Figure 1B:
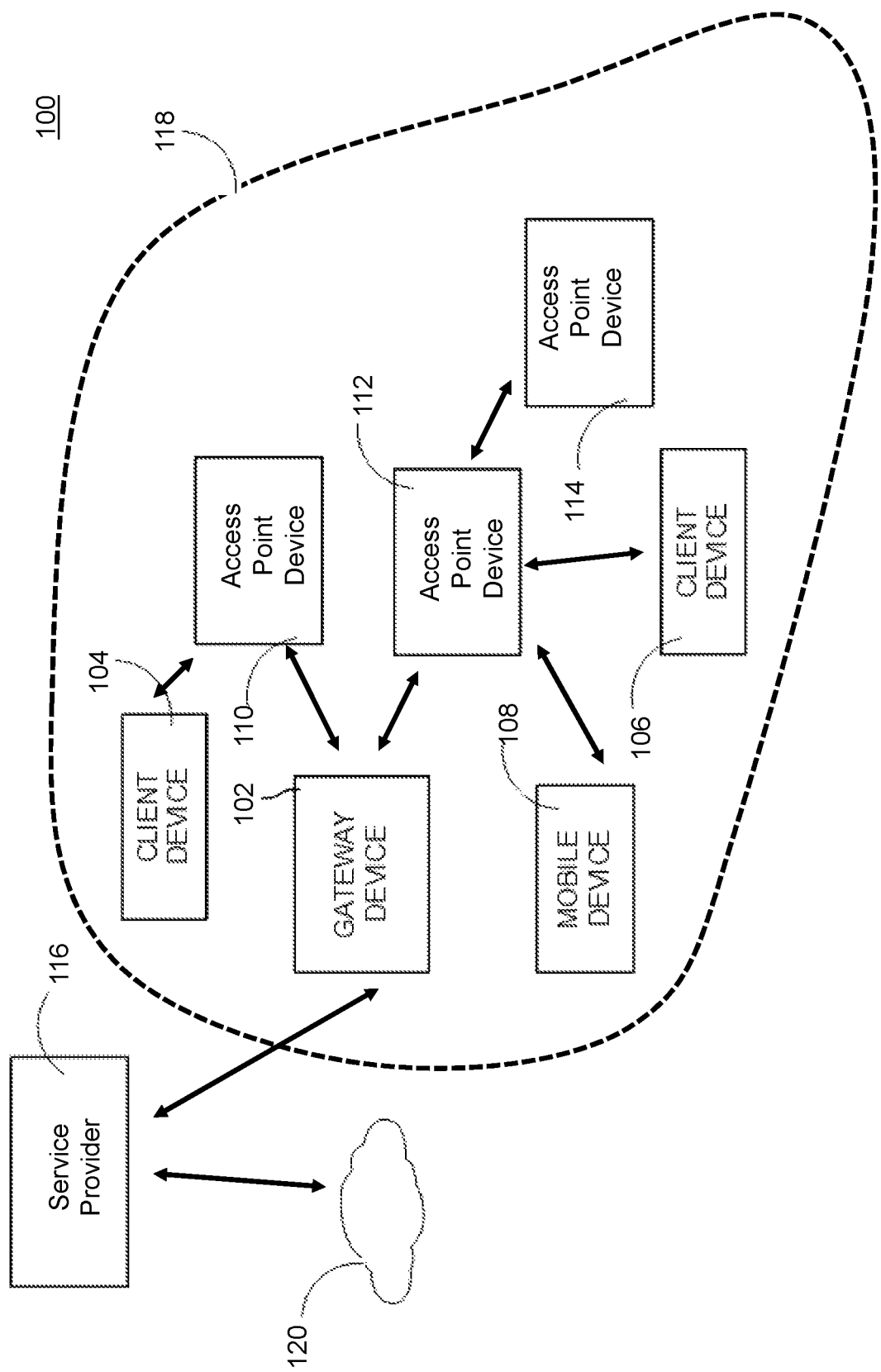
FIG. 1B illustrates structural components implementing the conventional electronic communication network of FIG. 1A at a time $T_1$, in accordance with aspects of the present disclosure.

FIG. 1B illustrates the conventional electronic communication network 100 of FIG. 1A, at a time $T_1$.

As shown in the figure, client device 106 dissociates with APD 114 and is now linked to APD 112. APD 112 may now be connected to both client device 106 as well as mobile device 108. As described in the foregoing, since client device 106 is recently steered to a different APD, client device 106 may temporarily put on a no-steer condition for a given period of time. In this period, APD 112 may have to keep servicing both client device 106 and mobile device 108, and therefore may undergo bandwidth and traffic congestion issues, thereby resulting in detrimental working of network 100.

Excessive client device steering attempts can result from a client device not being steered because its Wi-Fi logic rejects the steering attempt. For example, the client device rejects a BSS transition management (BTM) or blacklist request because it does not want to leave its currently comfortable RSSI association. This is particularly problematic for channel utilization or proactive band steers where RSSI is not an issue.

Excessive client device steering attempts can additionally result from a client device not being steered because its Wi-Fi driver does not support the type of steering type being employed. For example, BTM is chosen but the client device does not support BTM steering although it indicates such support. Further, flagging this condition is not feasible as it is hard to determine. Still further, even when it is determined, this can change with a new build with BTM support at any time.

Excessive client device steering attempts can additionally result from a client device not being proactively steering in part because it is band limited in its radio capability. For example, the client device only supports 2.4 GHz, but this is not easy to confirm.

Excessive client device steering attempts can additionally result from other client device Wi-Fi logic and/or limitations.

Detrimental results from excessive client device steering attempts can include clogging log files and potentially causing important historical log data to be lost given constrained log sizes (particularly files on the local network controller device, e.g. RG), and causing general operator concern over the condition.

Detrimental results from excessive client device steering attempts can additionally include blocking a client device from being chosen to be steered for a different steering trigger condition, should the other condition be of lower priority than the unsuccessful steering condition (e.g. blocking a client devices link quality steer if BH utilization is highest priority, depending on configuration settings).

Detrimental results from excessive client device steering attempts can additionally include blocking another client device from being chosen to be steered, should the other client device be lower in a client device selection list (e.g. blocking a different client device from being steered as it is lower in the client device steer list than the client device which was successfully being steered).

Detrimental results from excessive client device steering attempts can additionally include causing some client device Wi-Fi logic to kick the client device out of the Wi-Fi network and move into cellular network. This can be partially mitigated by temporary no-steer condition detection. However, there is a downside to over-relying on no-steer conditions as they typically require significant wait periods before allowing a client device to be steered again.

What is needed is a system and method for mitigating network issues resulting from transmission of excessive steering requests to one or more client devices operating within a multiple access point network.

A system and method in accordance with the present disclosure solves the problem of transmission of excessive steering requests to client devices in a multiple access point network.

In accordance with the present disclosure, a minimum delay period is waited before a steering request is sent by a network controller to one or more client devices. Further, back-off delays are added to the minimum delay, for subsequent steering requests, when the initial steering request transmitted to a given client device results in an unsuccessful steering attempt. The value of these back-off delays increase based on a trigger type, for which the steering request was initially transmitted. The back-off delays are added to the minimum delay, till a point in time when the value of the minimum delay reaches a predefined threshold value. Once the minimum delay reaches the predefined threshold value, the value is reset to the initial value of the minimum delay. Further, each trigger type may have a set of initial minimum delay value and a priority associated with it.

Such a method and system may ensure that excessive steering requests for a particular client device, associated with a particular BSS ID, are avoided. The back-off delay after each unsuccessful steering attempt guarantees that the next steering request is not sent before a cool-off period of time is waited for, thereby easing the load on the network. Further, increasing the back-off delay based on the type of trigger may avoid low-priority triggering of steering attempts to clog the network, thereby ensuring that network utilization for high-priority and urgent steering requests take preference.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

An example system and algorithm to be executed by a processor for mitigation of excessive client steering attempts in multiple access point networks, in accordance with aspects of the present disclosure will now be described in greater detail with reference to FIGS. 2-6.

Figure 2:
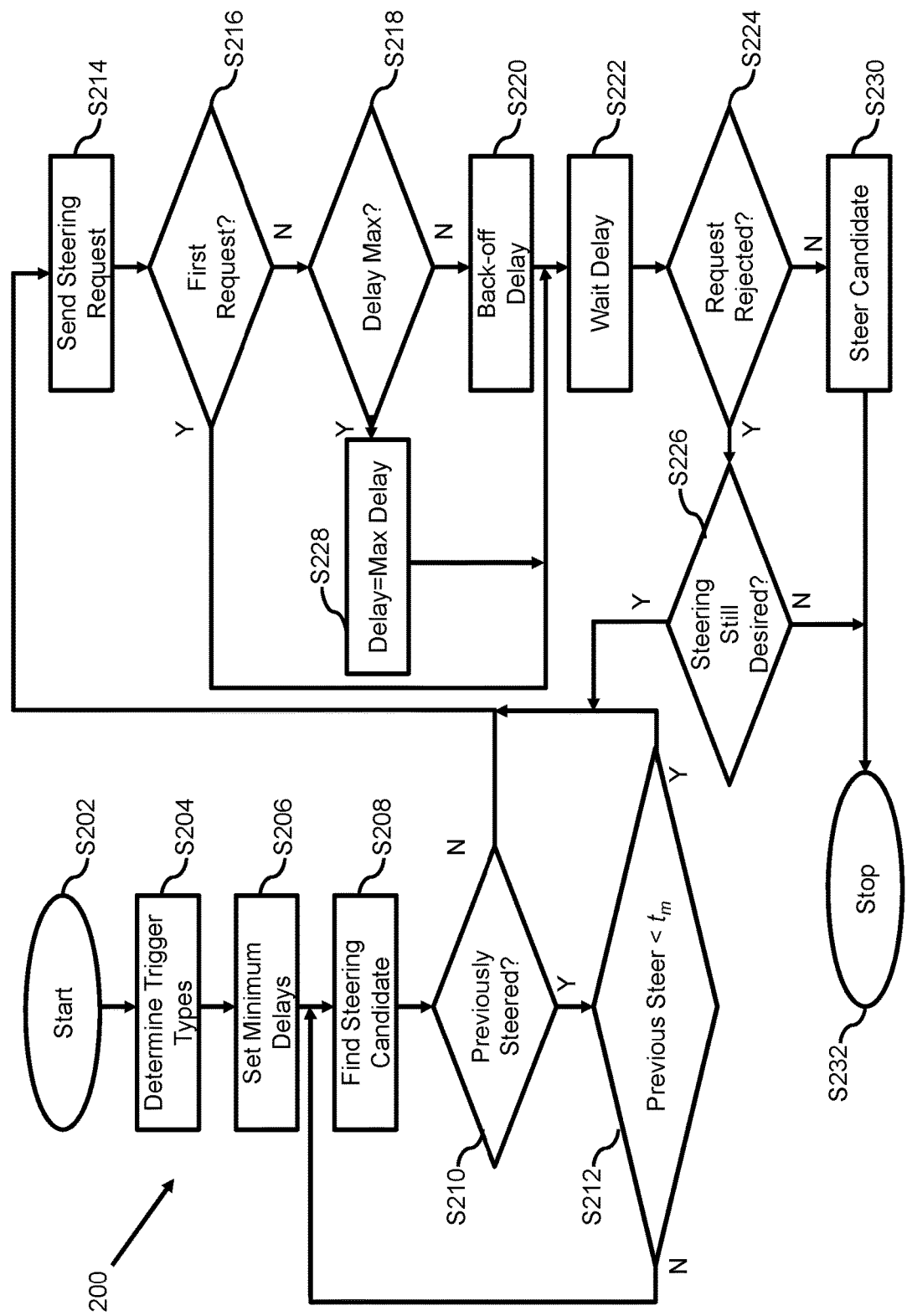
FIG. 2 illustrates an algorithm to be executed by a processor for steering a client device in a multiple access point network, in accordance with aspects of the present disclosure.

FIG. 2 illustrates an algorithm 200 to be executed by a processor for steering a client device in a multiple access point network, in accordance with aspects of the present disclosure. As will be described in greater detail below, an aspect of the present disclosure that an increasing backoff logic applies to failed steer attempt counts, but gets reset after a successful steer to a new BSSID. This reset of delay is needed to still be responsive to new conditions (poor link quality, etc) at a new SSID.

As shown in the figure, algorithm 200 to be executed by a processor starts (S202) and trigger types are determined (S204). The trigger types may be conditions that would prompt a gateway device to steer a client device from an associated APD to a different APD within a network. The trigger types, in an example, may be generated as a list of different network conditions, ranked in order of priorities, which may trigger a gateway device to send a steering request to one or more client devices to disassociate from their respective APDs and connect to new APDs within the network.

Figure 3A:
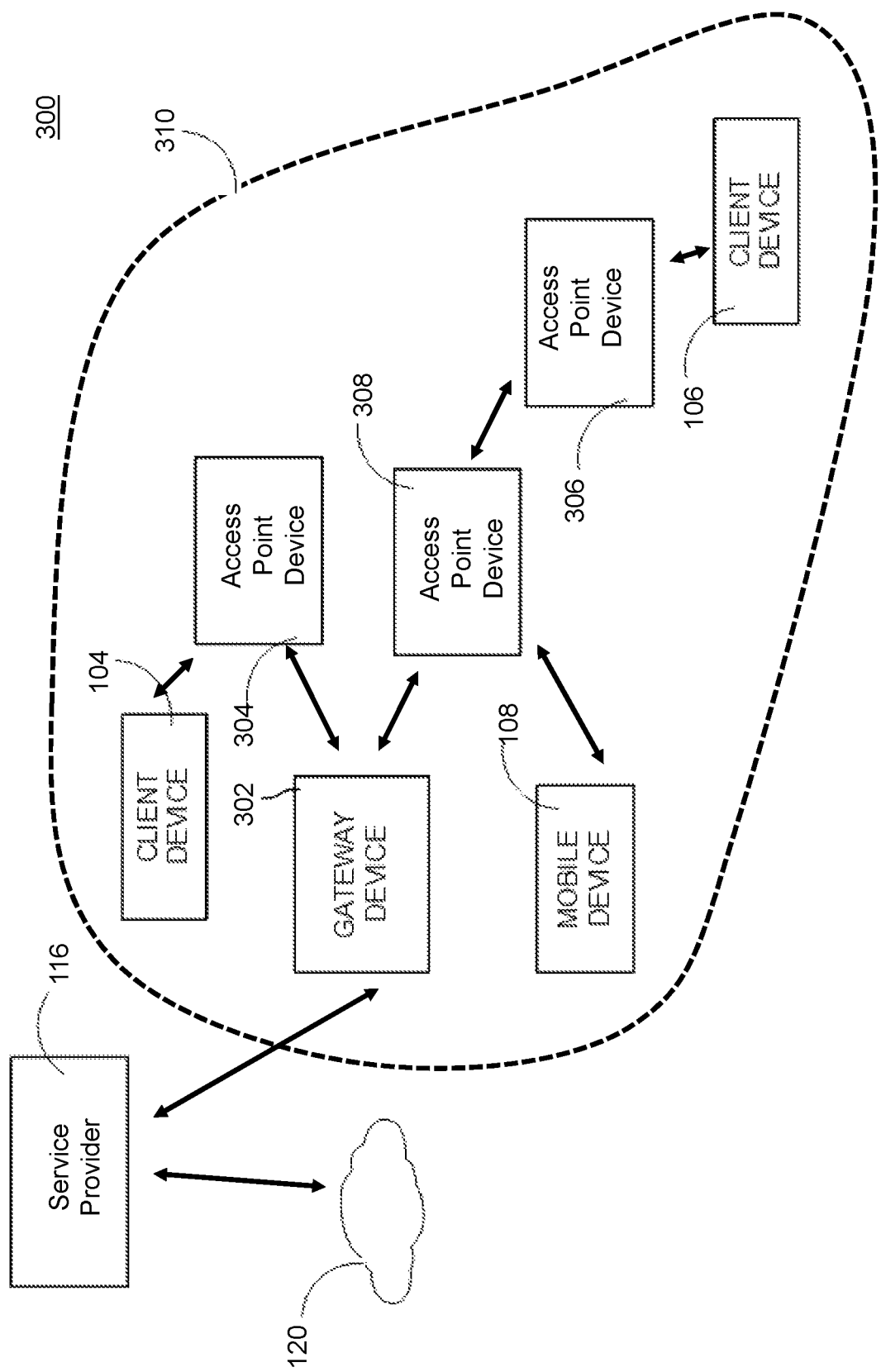
FIG. 3A illustrates structural components implementing an electronic communication network at a time $T_2$, in accordance with aspects of the present disclosure.

An example network having multiple client devices communicating to a gateway device through respective APDs is described in further details with reference to FIG. 3A.

FIG. 3A illustrates structural components implementing an electronic communication network 300 at a time $T_2$, in accordance with aspects of the present disclosure.

As shown in the figure, a gateway device 302 is able to communicate wirelessly directly with service provider 116, and further is able to connect to external network 120, e.g., the Internet, via service provider 116. Gateway device 302 also communicates with client device 104 via APD 304; with client device 106 via APD 306 and 308; and with mobile device 108 via APD 308, at the given time $T_2$.

Gateway device 302 may have one or more steering programs configured within, which may transmit steering request to one or more of client devices 104, 106, and mobile device 108, based on any of the trigger types being actuated. For instance, gateway device 302 may transmit a steering request to client device 104 to steer away from APD 304, when APD 304 suffers from network traffic congestion. In another example, gateway device 302 may send a steering request to client device 106 when it is determined that access point 308 has a higher radio frequency capability than access point 306, to which client device 106 is currently associated with.

Figure 4:
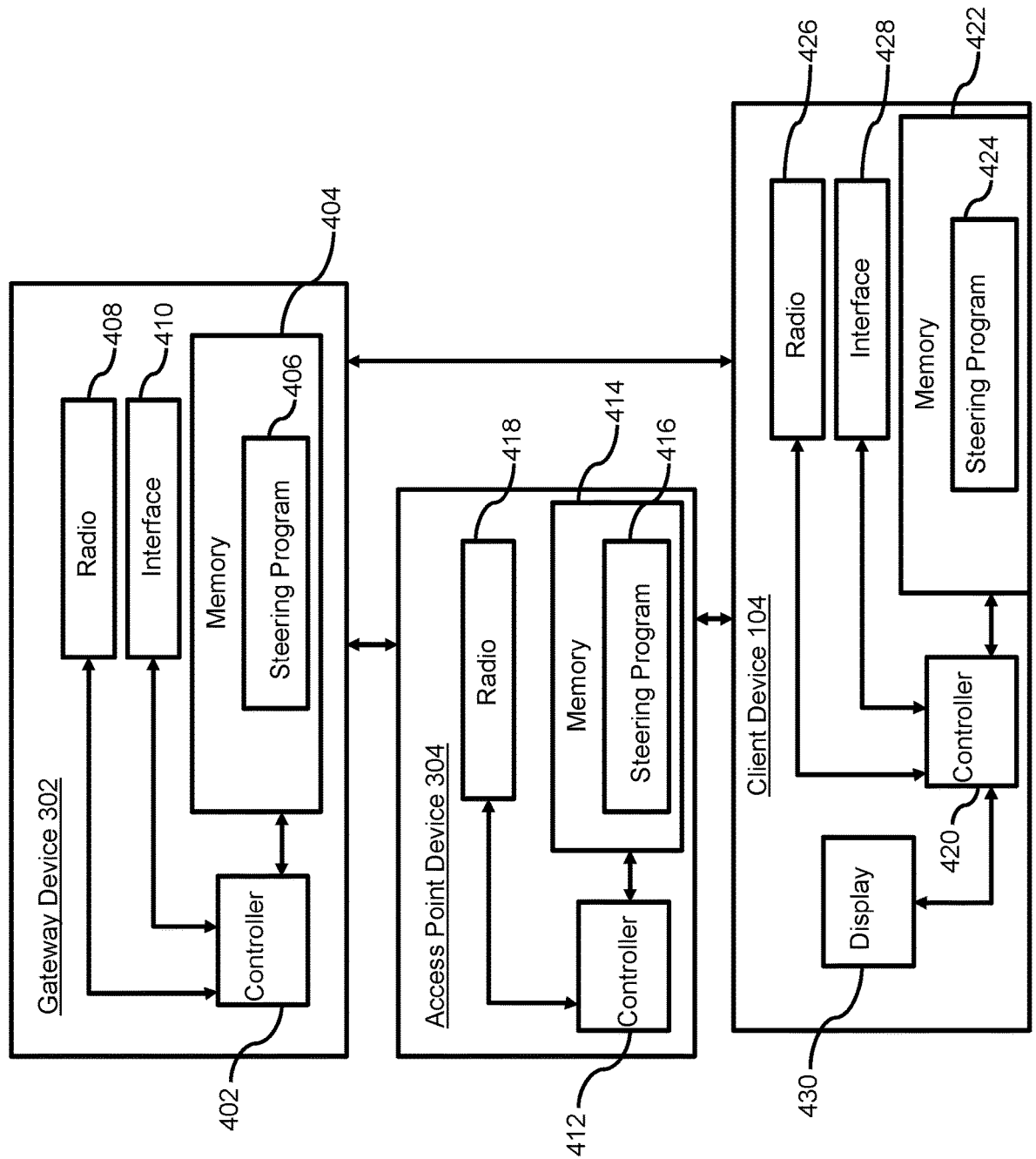
FIG. 4 illustrates an exploded view of a gateway device, an APD, and a client device, in accordance with aspects of the present disclosure.

Gateway device 302, APD 304, and client device 104, are described in additional detail with reference to FIG. 4.

FIG. 4 illustrates an exploded view of gateway device 302, APD 304, and client device 104 of FIG. 3A, in accordance with aspects of the present disclosure.

As shown in FIG. 4, gateway device 302 includes: a controller 402; a memory 404, which has stored therein a steering program 406; at least one radio, a sample of which is illustrated as a radio 408; and an interface circuit 410.

In this example, controller 402, memory 404, radio 408, and interface circuit 410 are illustrated as individual devices. However, in some embodiments, at least two of controller 402, memory 404, radio 408, and interface circuit 410 may be combined as a unitary device. Whether as individual devices or as combined devices, controller 402, memory 404, radio 408, and interface circuit 410 may be implemented as any combination of an apparatus, a system and an integrated circuit. Further, in some embodiments, at least one of controller 402, memory 404 and interface circuit 410 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 302 in accordance with the embodiments described in the present disclosure. In this example embodiment, controller 402 additionally operates as an HNC. However, it should be noted that in other embodiments, a controller of any one of the APDs, such as for example controller 412 of APD 304 may alternatively operate as an HNC.

Memory 404 can store various programming, and user content, and data including steering program 406. As will be described in greater detail below, in some embodiments, steering program 406 includes instructions, that when executed by controller 402, cause gateway device 302 to: (a) set a value of a steering delay based on a steering trigger type; (b) transmit a steering request to steer client device 104 from a first BSS ID to a second BSS ID; (c) determine whether client device 104 has steered from the first BSS ID to the second BSS ID during the steering delay measured from the transmission of the steering request; and (d) in response to a determination that client device 104 has not steered from the first BSS ID to the second BSS ID during the steering delay, increase the value of the steering delay by an increase amount and again transmit the steering request.

As will be described in greater detail below, in some embodiments, steering program 406 includes instructions, that when executed by controller 402, additionally cause gateway device 302 to repeat execution of (b) through (d) until the processor has determined that client device 104 has steered from the first BSS ID to the second BSS ID. Further, as will be described in greater detail below, in some of these embodiments, the increase amount is an exponential function such that as controller 402 repeats execution of (b) through (d), the value of the steering delay increases exponentially.

As will be described in greater detail below, in some embodiments, steering program 406 includes instructions, that when executed by controller 402, additionally cause gateway device 302 to set a maximum value based on the steering trigger type; repeat execution of (b) through (d); determine whether the value of the steering delay is the maximum value; and in response to a determination that the value of the steering delay is the maximum value, set the increase amount to zero so as to limit the value of the steering delay so as not to exceed the maximum value.

As will be described in greater detail below, in some embodiments, steering program 406 includes instructions, that when executed by controller 402, additionally cause gateway device 302 to set the value of the steering delay set in (a) based on the steering trigger type selected from a group of steering trigger types consisting of an RSSI type trigger, a traffic congestion type trigger, an intra-APD type trigger, and an APD to APD type trigger.

As will be described in greater detail below, in some embodiments, steering program 406 includes instructions, that when executed by controller 402, additionally cause gateway device 302 to transmit the steering request as a basic service system transition management steering request.

Interface circuit 410 can include one or more connectors, such as RF connectors, or Ethernet connectors, and/or wireless communication circuitry, such as 5G circuitry and one or more antennas. Interface circuit 410 receives content from service provider 116 (as shown in FIG. 3A) by known methods, non-limiting examples of which include terrestrial antenna, satellite dish, wired cable, DSL, optical fibers, or 5G as discussed above. Through interface circuit 410, gateway device 302 receives an input signal, including data and/or audio/video content, from service provider 116 and can send data to service provider 116.

Radio 408, (and preferably two or more radios), may also be referred to as a wireless communication circuit, such as a Wi-Fi WLAN interface radio transceiver and is operable to communicate with client devices 104, 106, and with mobile device 108 and with APDs 304, 306, and 308. Radio 408 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 302 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

APD 304 includes: a controller 412; a main memory 414, which has stored therein a steering program 416; and at least one radio, a sample of which is illustrated as a radio 418. It should be noted that additional APDs, including APDs 306, 308, have similar structure and operation to that of APD 304.

In this example, controller 412, main memory 414 and radio 418 are illustrated as individual devices. However, in some embodiments, at least two of controller 412, main memory 414 and radio 418 may be combined as a unitary device. Further, in some embodiments, at least one of controller 412 and main memory 414 may be implemented as a computer having tangible computer-readable media for carrying or having computer-executable instructions or data structures stored thereon.

Controller 412 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the APD 304 in accordance with the embodiments described in the present disclosure.

Memory 414 can store various programming, and user content, and data including steering program 416. Steering program 416 includes instructions, that when executed by controller 412, cause APD 304 to perform steering operations to steer client device 104.

Radio 418, such as a Wi-Fi WLAN interface radio transceiver, is operable to communicate with client devices 104, 106, and with mobile device 108 and with gateway device 302, as shown in FIG. 3A. Radio 418 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. APD 304 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Client device 104 includes: a controller 420; a main memory 422, which has stored therein a steering program 424; and at least one radio, a sample of which is illustrated as a radio 426; an interface 428; and a display 430.

In this example, controller 420, main memory 422, radio 426, interface 428 and display 430 are illustrated as individual devices. However, in some embodiments, at least two of controller 420, main memory 422, radio 426, interface 428 and display 430 may be combined as a unitary device. Further, in some embodiments, at least one of controller 420 and main memory 422 may be implemented as a computer having tangible computer-readable media for carrying or having computer-executable instructions or data structures stored thereon.

Controller 420, which can include a dedicated control circuit, CPU, microprocessor, etc., controls the circuits of client device 104. Memory 422 can store various programming, and user content, and data including steering program. Radio 426, may include a Wi-Fi WLAN interface radio transceiver that is operable to communicate with client devices 104, 106 and mobile device 108, with APDs 304, 306, and 308; and with gateway device 302, as shown in FIG. 3A, and also may include a cellular transceiver operable to communicate with service provider 116 through wireless network 120. Radio 426 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 104 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Any of the client devices within WLAN 310 may be a mobile device similar to client device 104. In the event that a client device within WLAN 310 is not a mobile device similar to client device 104, such a client device may still include: a controller, which can include a dedicated control circuit, CPU, microprocessor, etc., and that controls the circuits of the client device; a main memory, which has stored therein an onboarding program, that is similar to main memory 422 and steering program 424, respectively, of client device 104 discussed above; a radio similar to radio 426 of client device 104 discussed above; in additional to further functional circuitry. Accordingly, any of the client devices may include a Wi-Fi WLAN interface radio transceiver, that is operable to communicate with other client devices, with APDs 304, 306, and 308; and with gateway device 302, as shown in FIG. 3A and also may include a cellular transceiver operable to communicate with service provider 116 through wireless network 120. Further, any of the client devices may include a radio that is similar to radio 426 of client device 104 discussed above. Still further, any of the client devices may be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol, in a manner similar to mobile device 110 discussed above.

Insofar as gateway device 302 provides connection to service provider 116, such as an MSO, gateway device 302 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 3A as gateway device 302 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable gateway device 302 to be a so called smart media device. The foregoing description of various preferred embodiments have been presented for purposes of illustration and description. It is not intended to be exhaustive or to limit the present disclosure to the precise forms disclosed, and obviously many modifications and variations are possible in light of the above teaching.

As described in reference with FIG. 3A, gateway device 302 may request to steer client device 104 away from the BSS ID of APD 304 that it is currently associated with. The steering request may be sent based on one or more of the trigger types associated with network 100 at a given point in time. In an implementation, controller 402 of gateway device 302 may be configured to send the steering request to controller 420 of client device 104, via controller 412 of APD 304. Further, the steering request may be transmitted to client device 104 based on parameters programmed within steering program 406. Furthermore, controller 402 may transmit the steering request as a basic service system transition management steering request.

As shown in the figure, client device 104 may be associated with APD 304 to wirelessly communicate with the gateway device 302 via APD 304. In an embodiment, steering program 424 stored in memory 422 of client device 104 may have stored instructions that may be executed by controller 420 to determine if client device 104 can be steered away from its current APD association. For example, steering program 424 may have stored information including, but not limited to, Wi-Fi logic, frequency band information, BSS IDs, and discovery and configuration information for gateway device 302 and one or more APDs operating within network 300.

Further, steering program 416 stored in memory 414 of APD 104 may have stored instructions received from client device 104 that may be executed by APD 304 when one or more steering requests are received from controller 402 of gateway device 302, based on activation of a particular trigger type. The instructions may be executed to steer client device 104 or one or more of such requests may be rejected based on the information received from client device 104.

The different trigger types, in response to which controller 402 may transmit a steering request to client device 104, through APD 304, will now be described in greater detail with reference to FIG. 5.

FIG. 5 illustrates an example data structure 500 storing information pertaining to one or more trigger types, and respective minimum delay and back-off delay values for each of the one or more trigger types, in accordance with aspects of the present disclosure.

As shown in FIG. 5, the one or more trigger types may include RSSI level 502, traffic congestion 504, backhaul link utilization 506, and proactive load balancing 508. The one or more trigger types are listed in column 510 of table 500. Further, example minimum delays for each of the one or more trigger types are listed in column 512 and example calculations for determining back-off delays for each of the one or more trigger types are listed in column 514.

In this example, when the trigger type is RSSI level 502, the minimum delay is set at 5 seconds and the back-off delay is determined by $d(t_2)=d(t_1)+2$, where $t_1$ and $t_2$ are first minimum delay and second minimum delay, respectively. Further, for the trigger type traffic congestion 504, the minimum delay is set at 3 seconds and the back-off delay is determined by $d(t_2)=d(t_1)+5$. In other examples, for the trigger type backhaul link utilization 506, the minimum delay may be set at 6 seconds and the back-off delay may be determined by $d(t_2)=e^{\wedge}d(t_1)$. Similarly, for the trigger type proactive load balancing 508, the minimum delay may be set at 6 seconds and the back-off delay may be determined by $d(t_2)=2^{\wedge}d(t_1)$.

Returning now to FIG. 2, after the trigger types are determined (S204), minimum delays are set (S206).

In an example embodiment, the trigger types may have priorities assigned to them and minimum delays set for each of trigger type may be inversely proportional to the assigned priority. For example, as shown in FIG. 5, when the trigger type is traffic congestion 504, it may be assigned a highest priority and therefore the assigned minimum delay for such a trigger type may be the shortest. On the other hand, proactive load balancing 508 may have the lowest priority and therefore may be associated with the longest minimum delay. This may be done to ensure that steering requests for low priority trigger types are not sent excessively to a client device, in a short span of time, thereby avoiding detrimental operation of network 300. To further mitigate excessive steering requests for a trigger type having low priority, the back-off delay may also be increased exponentially after each failed steering attempt on a given client device, per APD. For example, if a steering request for a given client device is unsuccessful after the initial minimum delay of 6 seconds, and the trigger type is backhaul link utilization 506, the minimum delay is increased exponentially before another steering request is sent for the same trigger type at the end of the new minimum delay. In an implementation, after the minimum delay reaches a maximum value, the value may be reset back to the initial minimum delay, i.e., 6 seconds. In some embodiments, the minimum delay may be maintained at the maximum value while a client device remains on the same BSSID.

Returning to FIG. 2, after minimum delays are set (S206), a steering candidate is found (S208). For example, the steering candidate may be client device 106 associated with APD 306 within network 300.

As described in the foregoing, client device 106 may be selected as the steering candidate based on one or more trigger types being actuated for client device 106. Further, client device 106 may be selected as the steering candidate based on steering information associated with client devices 104, 106, and mobile device 108. This will be described in greater detail with respect to FIG. 6.

FIG. 6 illustrates a non-limiting example of a data structure 600 for storing steering information for one or more client devices, in accordance with aspects of the present disclosure.

As shown in FIG. 6, row 602 lists steering information for client device 104, row 604 lists steering information for client device 106, and row 606 lists steering information for client device 108. These client devices, such as client devices 104, 106 and mobile device 108, are listed under column 608 of table 600. Further, column 610 lists respective APDs that client devices 104, 106, and mobile device 108 are linked to, respectively. Furthermore, column 612 lists information about steering candidacy; column 614 lists steering request statuses; column 616 lists steering request denial information; column 618 lists request number information; and column 620 lists request delay information, for each of client devices 104, 106, and mobile device 108.

In the example shown in row 602, client device 104 is linked to APD 304 and is not a steering candidate. Further, there is no steering request sent to client device 104, and hence there is no request denial and request number information available.

In another example, as shown in row 604, client device 106 linked to APD 306 may be a steering candidate. The steering request may be therefore sent to client device 106, via APDs 306 and 308, by controller 402. In the example, client device 106 has denied the steering request and the last sent steering request was the third steering request. Further, since the steering request has been denied, a back-off delay denoted by d (3) may be added before a next steering request is sent.

In yet another example, mobile device 108 linked to APD 308 may also be a steering candidate. The steering request may be therefore sent to mobile device 108 by controller 402, via APD 308. In the example, mobile device 108 has also denied the steering request and the last sent steering request was the second request. Further, since the steering request has been denied, a back-off delay denoted by d (2) may be added before a next steering request is sent.

For the purposes of discussion of various embodiments of the present disclosure, client device 106, associated with APD 306, as shown in FIG. 3A, is taken as an example of a potential steering candidate.

Returning to FIG. 2, after the steering candidate is found (S208), it is determined if the steering candidate has been previously steered (S210). For example, it may be determined whether client device 106 has been steered away from APD 306 previously.

In an implementation, such a determination may be made to ensure that a given client device is not excessively requested for steering away from the BSS ID of its associated APD when the given client device has already been previously steered. Such an arrangement, in turn, ensures that detrimental workings of network 300 are mitigated by restricting steering requests to client devices that have been successfully steered in response to actuation of one or more the trigger types.

Returning to FIG. 2, if it is determined that the steering candidate has been previously steered (Y at S210), it is then determined whether time elapsed from the previous steer is less than a preset time delay, $t_m$. If it is determined that the time elapsed from the previous steer is less than $t_m$ (Y at S212), then algorithm 200 to be executed by a processor again finds a steering candidate (return to S208).

In an embodiment, the preset delay time may be introduced between steering requests sent to a previously steered client device to avoid a barrage of steering requests sent to the same client device repeatedly. For example, conventionally, in instances where a particular client device was previously steered and the client device disconnects from the network and then reconnects to the network within the preset time delay, a steering request may again be sent to the client device owing to the reconnection. This may be undesirable since the client device was already steered and sending another steering request may cause the network operation to falter. Therefore, to avoid repeated and excessive steering requests to the client device, the client device may be put on a temporary no-steer list till the preset time delay expires. Further, for such instances another steering candidate may be searched.

Returning to FIG. 2, if it determined that the time elapsed from the previous steer is greater than minimum steer delay $t_m$ (N at S212), or if it is determined that the steering candidate has not been previously steered (N at S210), then a steering request is sent (S214). For example, it may be determined that client device 106 has not been previously steered from APD 306. In another example, it may be determined that client device 106 was steered away from an APD before associating to APD 306, however, the preset delay time has since expired. In either case, controller 402 may be configured to send the steering request to client device 106, via APDs 306 and 308, when one or more trigger types are activated.

After the steering request is sent (S214), it is determined whether the steering request is a first steering request (S216). In the example discussed in FIG. 6, client device 106 is identified as the steering candidate and two steering requests were previously received by client device 106, via APDs 306 and 308, from controller 402. In another example, mobile device 108 may also be identified as a steering candidate with one steering request previously sent by controller 402.

Returning to FIG. 2, if it is determined that the steering request is not the first steering request (N at S216), it is determined whether a maximum time delay has been reached (S218). For example, as discussed in the foregoing, client device 106 may be a steering candidate having two previous steering requests received from controller 402. Once client device 106 is identified as the steering candidate, controller 402 may determine if the maximum delay time has reached since the last steering request was transmitted to client device 106 by controller 402, via APDs 306 and 308. In one implementation, the maximum delay time may be a sum of each back-off delay added after each unsuccessful steering request to steer client device 106, to a predefined threshold time limit. For example, if the trigger type is RSSI level 502, and the number of unsuccessful steering requests is two, the back-off delay may be 7 seconds after the first unsuccessful steering attempt, and 9 seconds after the second unsuccessful steering attempt. If the predefined threshold time limit is set to 10 seconds, it may be determined that the maximum delay has not been yet reached.

Returning to FIG. 2, if it is determined that the maximum time delay has not been reached (N at S218), then a back-off delay is added (S220). In an embodiment, the back-off delay may be based on the trigger type for which the steering request is being transmitted. The back-off delay, in an example, may be added to restrict excessive steering requests sent to the same client device, when one or more steering requests have been previously unsuccessful. Further, the back-off delay may be increased either linearly, or exponentially, based on the trigger type and associated priority for the trigger type. The back-off delay may be increased after each unsuccessful steering attempt, till the maximum delay is reached. Once the maximum delay is reached, the minimum delay value may be reset.

In an example shown in FIG. 5, if the trigger type is traffic congestion 504, minimum delay 512 initially is set at 3 seconds. If the previous steering request for the client device 106 has been unsuccessful, the back-off delay may be calculated as $d(t_2)=d(t_1)+5$, i.e., 8 seconds. If the maximum delay for this case is set at 15 seconds, addition of the back-off delay to the minimum delay would still not equal to the maximum delay value. Hence, the back-off delay is added to the minimum delay, i.e., the new value for the minimum delay may be set at 11 seconds.

Returning to FIG. 2, if it is determined that the maximum delay has been reached (Y at S218), then the minimum delay is set to the maximum delay (S228). For instance, referring to the above example, if the consecutive back-off delays result in the total minimum delay value to reaching the maximum delay value of 15 seconds, the minimum delay value may now be set at 15 seconds. That is, any subsequent steering request for traffic congestion 504 trigger type, may have to be delayed by 15 seconds after a previously unsuccessful steering request.

However, if it is determined that the steering request is the first steering request (Y at S216), the initial minimum delay period is waited.

Similarly, after the delay is set to the maximum delay (S228), the maximum delay period is waited (S222). For example, if the value of minimum delays after addition of one or more back-off delays result in the value reaching the maximum delay value, this maximum delay period is waited by controller 402, before sending the steering request to client 106, via APD 306.

Returning to FIG. 2, after the delay is waited (S222), it is determined whether the transmitted steering request is rejected (S224). For example, the determination may be made based on one or more pings received via APD 306 that client device 106 may currently be associated with. These one or more pings, in an example, may include information pertaining to the rejection of the steering request by client device 106. The steering request, in an example, may be rejected if client device 106 moves away from the proximity of network 300. The request, in another example, may also be rejected due to client device 106 being unable to dissociate from APD 306 owing to wi-fi logic and/or other limitations.

If it is determined that the steering request is rejected (Y at S224), then it is determined whether steering is still desired (S226). For example, the steering may not be desirable if the client device leaves network 300. On the other hand, the steering may still be desirable if APD 306 continues to operate under bandwidth and/or traffic congestion issues.

Returning to FIG. 2, if it is determined that steering is still desired (Y at S226), then the steering request is sent (return to S214). However, if it is determined that steering is no longer desired (S226), then algorithm 200 to be executed by a processor stops (S232).

Further, it determined that the steering request is not rejected (N at S224), then the candidate is steered (S230).

In an implementation, after the candidate is steered (S230), the minimum delay may be reset to the initial minimum delay value. Further, after the steering is complete, client device 106 may associate with another APD, such as APD 308, as described in detail with reference to FIG. 3B.

Figure 3B:
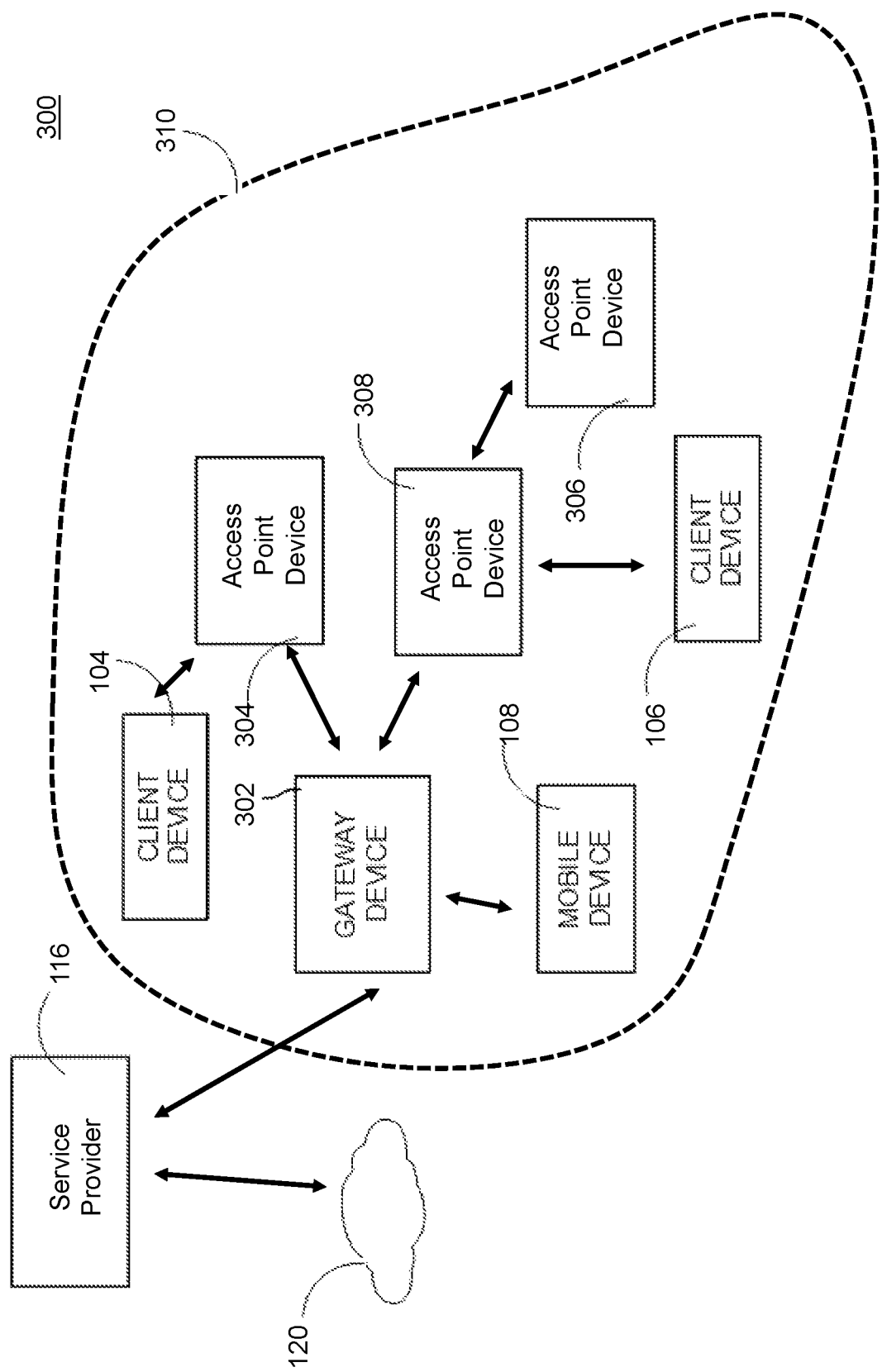
FIG. 3B illustrates structural components implementing the electronic communication network of FIG. 3A at a time $T_3$, in accordance with aspects of the present disclosure.

FIG. 3B illustrates structural components implementing the electronic communication network 300 at a time $T_3$, in accordance with aspects of the present disclosure.

As shown in the figure, gateway device 302 may steer client device 106 to disassociate with APD 306, as shown in FIG. 3A, and re-associate with APD 308. In this implementation, gateway device 302 communicates with client device 104 via APD 304; and with client device 106 and mobile device 108 via APD 308, at the given time $T_3$.

Returning to FIG. 2, after the candidate is steered (S230), then algorithm 200 to be executed by a processor stops (S232).

Excessive client device steering attempts can result from: a client device not being steered because its Wi-Fi logic rejects the steering attempt; a client device not being steered because its Wi-Fi driver does not support the type of steering type being employed; a client device not being proactively steered part because it is band limited in its radio capability; and other client device Wi-Fi logic and/or limitations.

Detrimental results from excessive client device steering attempts can include: clogging log files and potentially causing important historical log data to be lost given constrained log sizes (particularly files on the local network controller device, e.g. RG), and causing general operator concern over the condition; blocking a client device from being chosen to be steered for a different steering trigger condition, should the other condition be of lower priority than the unsuccessful steering condition (e.g. blocking a client devices link quality steer if BH utilization is highest priority, depending on configuration settings); blocking another client device from being chosen to be steered, should the other client device be lower in a client device selection list (e.g. blocking a different client device from being steered as it is lower in the client device steer list than the client device which was is successfully being steered); and causing some client device Wi-Fi logic to kick the client device out of the Wi-Fi network and move into cellular network. This can be partially mitigated by temporary no-steer condition detection.

A system and method in accordance with aspects of the present disclosure avoids excessive client device steering attempts and thus reduces the detrimental results of excessive client device steering attempts. This disclosure applies additional client device steering restrictions to avoid conditions where attempts to steer a client device become excessive and detrimental. This includes dynamically adjusting a client device's steering delay time period as a function of its prior steer outcome, on a given BSS, and as a function of the steering trigger type for maximum control flexibility.

The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A network controller for use with a client device, said network controller comprising:
   a memory; and
   a processor configured to execute instructions stored on said memory to cause said network controller to:
   (a) set a value of a steering delay based on a steering trigger type;
   (b) transmit a steering request to steer the client device from a first BSS ID to a second BSS ID;
   (c) determine whether the client device has steered from the first BSS ID to the second BSS ID during the steering delay measured from the transmission of the steering request; and
   (d) in response to a determination that the client device has not steered from the first BSS ID to the second BSS ID during the steering delay, increase the value of the steering delay by an increase amount and again transmit the steering request.

2. The network controller of claim 1, wherein said processor is configured to execute instructions stored on said memory to cause said network controller to:
   repeat execution of (b) through (d) until the processor has determined that the client device has steered from the first BSS ID to the second BSS ID.

3. The network controller of claim 2, wherein the increase amount is an exponential function such that as the processor repeats execution of (b) through (d), the value of the steering delay increases exponentially.

4. The network controller of claim 1, wherein said processor is configured to execute instructions stored on said memory to cause said network controller to:
   set a maximum value based on the steering trigger type;
   repeat execution of (b) through (d);
   determine whether the value of the steering delay is the maximum value; and
   in response to a determination that the value of the steering delay is the maximum value, set the increase amount to zero so as to limit the value of the steering delay so as not to exceed the maximum value.

5. The network controller of claim 1, wherein the value of the steering delay set in (a) is based on the steering trigger type selected from a group of steering trigger types consisting of a received signal strength indicator type trigger, a traffic congestion type trigger, backhaul link utilization and proactive load balancing.

6. The network controller of claim 1, wherein said processor is configured to execute instructions stored on said memory to cause said network controller to transmit the steering request as a basic service system transition management steering request.

7. A method of using network controller with a client device, said method comprising:
   (a) setting, via a processor configured to execute instructions stored on a memory, a value of a steering delay based on a steering trigger type;
   (b) transmitting, via the processor, a steering request to steer the client device from a first BSS ID to a second BSS ID;
   (c) determining, via the processor, whether the client device has steered from the first BSS ID to the second BSS ID during the steering delay measured from the transmission of the steering request; and
   (d) in response to a determination that the client device has not steered from the first BSS ID to the second BSS ID during the steering delay, increasing, via the processor, the value of the steering delay by an increase amount and again transmit the steering request.

8. The method of claim 7, further comprising repeating, via the processor, execution of (b) through (d) until the processor has determined that the client device has steered from the first BSS ID to the second BSS ID.

9. The method of claim 8, wherein the increase amount is an exponential function such that as the processor repeats execution of (b) through (d), the value of the steering delay increases exponentially.

10. The method of claim 7, further comprising:
    setting, via the processor, a maximum value based on the steering trigger type;
    repeating, via the processor, execution of (b) through (d);
    determining, via the processor, whether the value of the steering delay is the maximum value; and
    in response to a determination that the value of the steering delay is the maximum value, setting, via the processor, the increase amount to zero so as to limit the value of the steering delay so as not to exceed the maximum value.

11. The method of claim 7, wherein the value of the steering delay set in (a) is based on the steering trigger type selected from a group of steering trigger types consisting of a received signal strength indicator type trigger, a traffic congestion type trigger, backhaul link utilization and proactive load balancing.

12. The method of claim 7, wherein said transmitting the steering request comprises transmitting, via the processor, the steering request as a basic service system transition management steering request.

13. A non-transitory, computer-readable media having computer-readable instructions stored thereon, the computer-readable instructions being capable of being read by a network controller for use with a client device, wherein the computer-readable instructions are capable of instructing the network controller to perform the method comprising:
    (a) setting, via a processor configured to execute instructions stored on a memory, a value of a steering delay based on a steering trigger type;
    (b) transmitting, via the processor, a steering request to steer the client device from a first BSS ID to a second BSS ID;
    (c) determining, via the processor, whether the client device has steered from the first BSS ID to the second BSS ID during the steering delay measured from the transmission of the steering request; and
    (d) in response to a determination that the client device has not steered from the first BSS ID to the second BSS ID during the steering delay, increasing, via the processor, the value of the steering delay by an increase amount and again transmit the steering request.

14. The non-transitory, computer-readable media of claim 13, wherein the computer-readable instructions are capable of instructing the network controller to perform the method further comprising repeating, via the processor, execution of (b) through (d) until the processor has determined that the client device has steered from the first BSS ID to the second BSS ID.

15. The non-transitory, computer-readable media of claim 14, wherein the computer-readable instructions are capable of instructing the network controller to perform the method wherein the increase amount is an exponential function such that as the processor repeats execution of (b) through (d), the value of the steering delay increases exponentially.

16. The non-transitory, computer-readable media of claim 13, wherein the computer-readable instructions are capable of instructing the network controller to perform the method further comprising:
    setting, via the processor, a maximum value based on the steering trigger type;
    repeating, via the processor, execution of (b) through (d);
    determining, via the processor, whether the value of the steering delay is the maximum value; and
    in response to a determination that the value of the steering delay is the maximum value, setting, via the processor, the increase amount to zero so as to limit the value of the steering delay so as not to exceed the maximum value.

17. The non-transitory, computer-readable media of claim 13, wherein the computer-readable instructions are capable of instructing the network controller to perform the method wherein the value of the steering delay set in (a) is based on the steering trigger type selected from a group of steering trigger types consisting of a received signal strength indicator type trigger, a traffic congestion type trigger, backhaul link utilization and proactive load balancing.

18. The non-transitory, computer-readable media of claim 13, wherein the computer-readable instructions are capable of instructing the network controller to perform the method wherein said transmitting the steering request comprises transmitting, via the processor, the steering request as a basic service system transition management steering request.

* * * * *